(12) United States Patent
Wietfeldt

(10) Patent No.: US 7,024,223 B1
(45) Date of Patent: Apr. 4, 2006

(54) SYSTEMS AND METHODS FOR A MULTI-PLATFORM WIRELESS MODEM

(75) Inventor: Richard Dominic Wietfeldt, San Diego, CA (US)

(73) Assignee: Novatel Wireless, Inc., San Diego, CA (US)

( * ) Notice: Subject to any disclaimer, the term of this patent is extended or adjusted under 35 U.S.C. 154(b) by 533 days.

(21) Appl. No.: 10/091,953

(22) Filed: Mar. 5, 2002

Related U.S. Application Data

(60) Provisional application No. 60/273,760, filed on Mar. 5, 2001.

(51) Int. Cl.
*H04B 1/38* (2006.01)
(52) U.S. Cl. .................. 455/557; 455/558; 329/312; 332/109; 375/222
(58) Field of Classification Search ............... 455/557, 455/558, 95, 39, 41.2, 507; 709/200, 217, 709/237, 221, 228; 332/101, 119, 109; 329/311, 329/312; 375/130, 219, 222
See application file for complete search history.

(56) References Cited

U.S. PATENT DOCUMENTS

| | | | |
|---|---|---|---|
| 5,896,060 A * | 4/1999 | Ovard et al. ................. 329/304 |
| 6,205,522 B1 * | 3/2001 | Hudson et al. ............. 711/147 |
| 6,697,415 B1 * | 2/2004 | Mahany ....................... 375/130 |
| 2002/0028655 A1 * | 3/2002 | Rosener et al. ............... 455/16 |

* cited by examiner

*Primary Examiner*—Edward F. Urban
*Assistant Examiner*—Thuan Nguyen
(74) *Attorney, Agent, or Firm*—Foley & Lardner, LLP

(57) ABSTRACT

A standard interface for interfacing a wireless modem assembly with a host device comprises a primary serial interface, a secondary serial interface, and a differential serial interface for supporting communication between the wireless modem assembly and the host device. The standard interface can be implemented in a standardized connector, such as a 70-pin connector having unused pins for future feature expansion. The standard interface also provides for other interfaces including, for example, power, modem status, audio, voice, general purpose input/output, and subscriber identification.

44 Claims, 6 Drawing Sheets

SYSTEMS AND METHODS FOR A MULTI-PLATFORM WIRELESS MODEM

RELATED APPLICATIONS

This application claims benefit under 35 U.S.C. § 119 of U.S. Provisional Application Ser. No. 60/273,760, filed Mar. 5, 2001, which is incorporated herein by reference, and this application is related to co-pending United States Application entitled "SYSTEMS AND METHODS FOR A MULTI-PLATFORM WIRELESS MODEM", Application Ser. No. 10/091,965.

BACKGROUND OF THE INVENTION

1. Field of the Invention

The present invention relates generally to wireless data communication and, more particularly, to systems and methods for a multi-platform wireless modem.

2. Background

Wireless communication and portable computing are converging. As a result, many portable computing devices incorporate a wireless modem for data communication. A wireless modem uses wireless communication channels to replace a more traditional wired connection through, for example, a telephone or a cable line. Also, in order to meet an increased demand for wireless data communication, wireless system operators have developed a variety of data communication protocols to support wireless data communication within their systems. Unfortunately, this has resulted in a plurality of incompatible data communication systems and protocols.

The plurality of systems and protocols creates problems for wireless modem manufacturers, because a wireless modem manufacturer must design a different modem for each communication system and/or protocol. Making matters worse for the manufacturer, different portable computing devices may require the wireless modem to have a specific form factor. Each portable computing device may also define a different software protocol for communication between the computing device and the wireless modem. As a result, the wireless modem manufacturer may have to design a different wireless modem assembly for each type of communication protocol and each type of portable computing device. The duplication creates excess cost for the manufacturer and makes changing or upgrading modems difficult for the user.

For purposes of this specification and the claims that follow, the term wireless communication protocol is used to refer to both the air interface standard used by the wireless modem to access a communication channel in a particular communication system and to the communication protocol used by devices in the system to communicate with each other. Common air interface standards include Frequency Division Multiple Access (FDMA), Time Division Multiple Access (TDMA), as defined for example by the IS-136 specification, Global System for Mobile (GSM) communications, and Code Division Multiple Access (CDMA) as defined for example by the IS-95 specification. There is also a world wide effort to consolidate the different wireless communication protocols into a single standardized protocol known as third generation or "3G".

Despite efforts to achieve convergence in the so-called 3G communication protocols, however, there is still considerable confusion in the market-place. The confusion is made worse by numerous proprietary, non-standard protocols in use in a variety of systems, and even when a standard protocol is used differences in implementation between offerings from multiple modem vendors, or between those from a single vendor, make transitioning between vendors and/or technologies difficult for the end user. As a result, the concept of seamless replacement is not available to the end user or system integrator, which results in added cost, frustration, and delayed time-to-market, as well as reduced competitiveness in the market place.

SUMMARY OF THE INVENTION

In order to combat these problems, the systems and methods for a multi-platform wireless modem provide for standardization of a wireless modem in several key areas as well as the ability to seamlessly configure the wireless modem to implement different communication protocols and/or air interface standards.

Some key areas of standardization include: a standard form factor, a standard core module that comprises a baseband section and an RF section, a standard software protocol for communication between the wireless modem and a host device, a standardized interface between the standard core module and the host device, and standard methods for power management.

Configurability is achieved by configuring the core module to be removable. This way, the wireless modem can be configured for different communication protocols and/or air interface standards by removing and replacing the core module. Additionally, certain aspects of the software protocol and the power management methods are left undefined so that they can be customized for a particular implementation.

Further features and advantages of this invention as well as the structure of operation of various embodiments are described in detail below with reference to the accompanying drawings.

BRIEF DESCRIPTION OF THE DRAWINGS

The forgoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENTS

1. Standard Core Module

Figure 1:
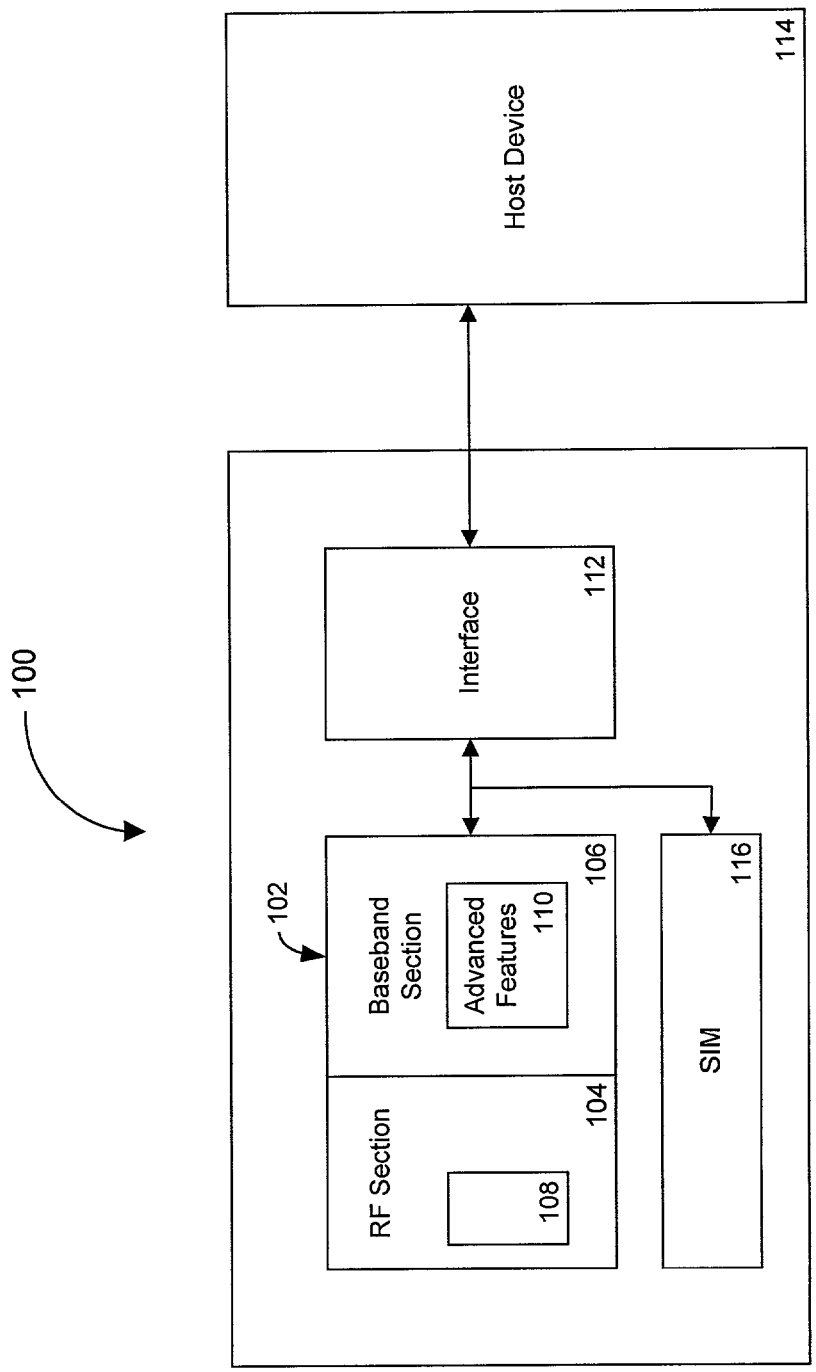
FIG. 1 is an example embodiment of a wireless modem assembly in accordance with the invention.

FIG. 1 illustrates a wireless modem assembly 100 in accordance with the systems and methods for a multi-platform wireless modem. Assembly 100 comprises a core module 102 and an interface 112 for interfacing assembly 100 to a host device 114 in which assembly 100 is installed or with which assembly 100 is connected. Core module 102 can further comprises SIM card support 116, RF section 104 having antenna connector 108, and baseband section 106 configured to support one or more advanced features 110, explained in detail below.

The systems and methods for a multi-platform wireless modem provide a future-proofed multi-technology, multi-platform strategy that provides standardization across the following primary areas:

Physical form-factor;
Standard host interface;
Software protocol;
RF connection, including support for future antenna technologies; and
Power management.

The standardization is achieved through the combination of core module 102 and interface 112. Interface 112 is preferably configured to provide a standard interface between assembly 100 and host device 114. This greatly simplifies the complexity of designing a core module 102, because it can be designed for one standard interface, regardless of the type of host device 114. Interface 114 is discussed more fully below.

Core Module 102 also preferably enables standardization in terms of different end-user form-factors, different user interfaces, and different host platforms as well as standardization across different communication protocols. Such standardization is achieved using cross-technology standardization principles in the design of different core modules 102 intended for different applications. By incorporating these principles into the design of different core modules 102, they preferably become interchangeable. Therefore, a single wireless modem assembly 100 can easily be configured for different environments by simply swapping out one core module 102 for another. For example, if wireless modem assembly 100 is switched form a Cellular Digital Packet Data (CDPD) environment to an Enhanced Data GSM Environment (EDGE) environment, all that is needed is to switch core module 102 from a CDPD module to an EDGE module.

This standardization, however, goes beyond designing each core module 102 so that it can plug into the same socket or connector in assembly 100. For example, each module 102 is preferably configured to communicate over a standard interface 112 as opposed to each module 102 being configured for a device specific interface. As will be explained below, standardization of interface 112 also preferably requires that the software communications protocols used to communicate over interface 112 be standardized. Therefore, each core module 102 only needs to be configured to support one communication protocol for communicating with host device 114. The standardization principles further include future-proofing provisions designed to enable backward-compatible customizations for future modules with smaller form-factors, that supports new wireless communication protocols, and that support greater power (current) requirements, new software features, future antenna technologies, future power management features/algorithms, etc. Therefore, future wireless modem assemblies 100 can reduce the impact and cost of migrating to a new technology, form factor, etc., by being configured to use core modules 102.

As described above the standardization principles address the shortcomings of current solutions by permitting migration from one communication protocol or technology to another via removal of one core module 102 and simple replacement with another module 102. The physical replacement of a core module 102 will generally require a host software protocol upgrade to accommodate new or enhanced features and/or protocols specific to a given host device 114, and may require an increase in power (current) supplied to assembly 100. Such changes are generally recognized to be significantly easier than a redesign of the physical interface to support different form-factors, features, possibly connectors, etc., which is required by conventional migration techniques.

Moreover, the standardization described allows the manufacturer to significantly streamline his manufacturing efforts, thus providing significant costs savings. Essentially, the manufacturer can build one standard wireless modem assembly 100 instead of a different assembly 100 for each different application. The manufacturer will then need to build different core modules 102 as required for different applications. But by implementing the standardization principles described, variations in the manufacturing process for these different modules 102 is minimal. Thus, overall manufacturing cost are reduced. Moreover, in some embodiments, the standardization in design of core modules 102 allows a wireless modem assembly 100 to be reconfigured for a different application via software reconfiguration of core module 102, which enables such advantages as over the air reconfiguration of assembly 100.

In order to facilitate replacement of core module 102, assembly 100 preferably includes a standard connector or socket (not shown) configured to receive core module 102. This, of course, requires that core module 102 include the correct type of interface in terms of both hardware and software for interfacing with the standard connector. Core module 102 also preferably conforms to a standard form factor. This allows the use of a standard connector as discussed. It also is another factor in easing migration from technology to technology or from one type of host device 114 to another.

RF Section 104 and baseband section 106 are discussed in detail in the following sections. RF section 104 is responsible for interfacing wireless modem assembly 100 to other devices over a wireless communication channel. Baseband section 106 is responsible for communicating information from host device 114 to those other devices, and vice versa, once assembly 100 is connected to them over the communication channel. In the sections that follow various other aspects of assembly 100 are discussed, with specific attention to how the design of assembly 100 is standardized in accordance with the systems and methods described herein.

a. The RF Section

Figure 2:
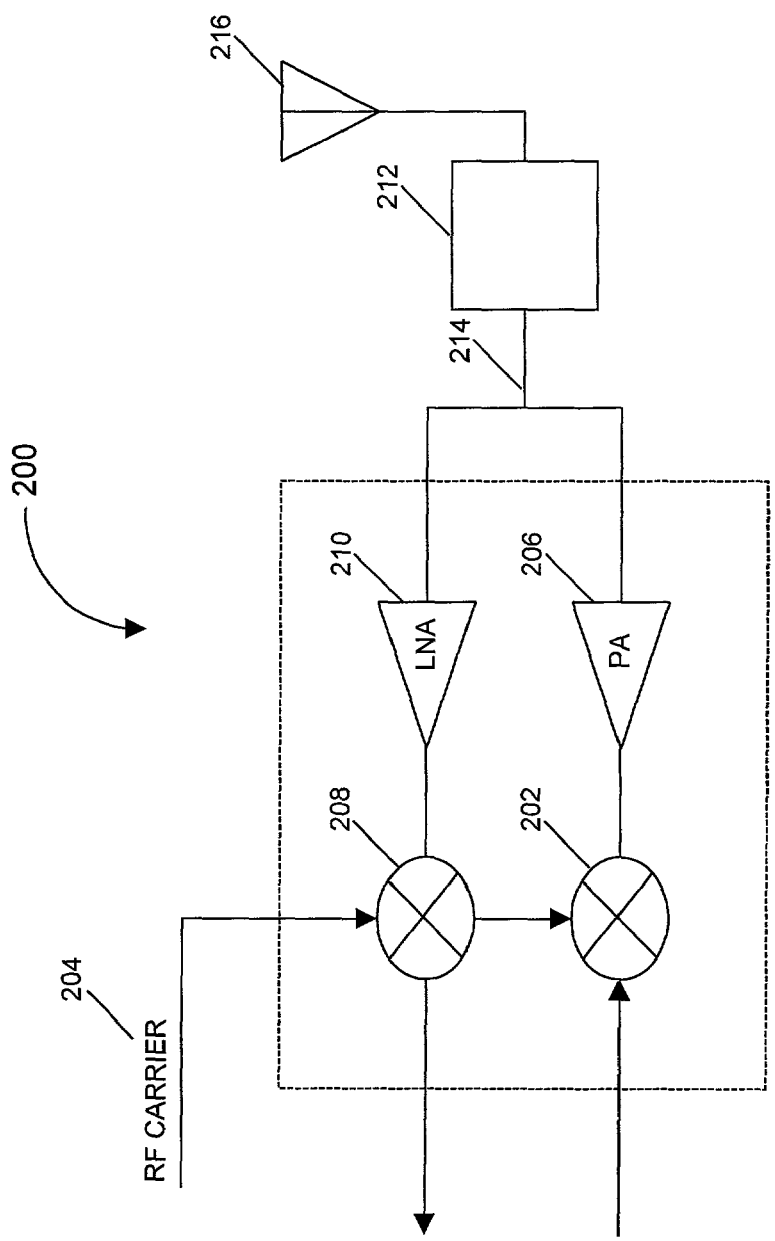
FIG. 2 is an example RF transceiver that can be included in the wireless modem assembly of FIG. 1.

RF section 104 comprises a transceiver used to transmit and receive RF signals over a wireless communication channel in accordance with the appropriate air interface standard. An example transceiver 200 is illustrated in FIG. 2. Transceiver 200 is split into a transmit and receive path. The transmit path comprises a modulator 202 that modulates baseband signals from baseband section 106 (see FIG. 1) with an RF carrier 204 in order to generate an RF transmit signal. RF carrier 204 is a sinusoidal carrier signal with a frequency equal to that required by the communication channel used by modem assembly 100 to communicate with other devices. The transmit path of transceiver 200 may also include a Power Amplifier (PA) 206. PAs are typically key components in any high frequency RF transmitter design. This is because RF transmitters typically require high output power to compensate for path losses and to achieve satisfactory signal levels at the antenna connected to antenna connector 108 (see Figures).

The receive path of transceiver 200 comprises a demodulator 208 that modulates a received RF signal with RF carrier 204 in order to remove the carrier and extract the baseband information signal. The receive path may also include a Low Noise Amplifier (LNA) 210. The RF signals received by the antenna are typically at very low signal levels. Therefore, a LNA 210 is used to amplify the signal level, but not introduce noise that could swamp the low level received signal.

The receive and transmit paths are typically duplexed over a common connection, e.g., antenna connector 108, to the antenna 216. The impedance of the connection, however, needs to match the impedance of the antenna for the antenna to transmit the RF transmit signal efficiently. If the impedance is not matched, then RF energy will be reflected back in the opposite direction when a transmit or receive RF signal reaches the connection. Therefore, a matching network 212 can be included in order to match the impedance between the connection and the antenna. Typically, for example, the connection will have impedance of 50 ohms. Therefore, the matching network needs to adjust the impedance of the antenna to be reasonably close to 50 ohms at the signal frequency.

RF section 104 also includes an antenna connection 108 for connecting wireless modem assembly 100 to whatever antenna is being used. As part of the standardization principles discussed above, antenna connection 108 is preferably a standard connector used for all air interface standards that assembly 100 can be configured to implement. This significantly reduces design complexity by allowing a standard connector to be selected for all possible configuration of assembly 100, which saves manufacturing time and cost. It also allows for easy reconfiguration of assembly 100 by simply installing the appropriate core module 102 and the appropriate antenna. Moreover, depending on the implementation, it can also allow for module 102 to be reconfigured for a different air interface via a software reconfiguration and installation of the appropriate antenna into connector 108. This ability substantially streamlines the manufacturing process and even allows for reconfiguration of assembly 100 in the field.

Differences in air interface standards and in host devices, however, can make it difficult to have a common antenna connection for all possible configurations of assembly 100. These differences require that in some instances, a different antenna type must be used depending on the configuration. Differences in antenna types prevent the use of a standard connector for several reasons. First, direct antenna connections are generally custom designed for the specific antenna type. Second, different antennas will require different tuning, which will not only impact the type of connector, but can also impact the design of RF section 104. Moreover, regulatory requirements for some host devices preclude using a standard connector for all configurations. Preferably, however, wireless modem assembly 100 comprises an antenna connector 108 that is reusable for as many configurations as possible, thus permitting the use of a broad range of antenna solutions including internal, external, and patch antennas. Further, with the advent of third generation (3G) wireless systems, it may be even more practical to use a common antenna and therefore a common antenna connector 108.

Regardless of what connector is used, it is also preferable for assembly 100 to have a standard location for antenna connector 108 in accordance with the standardization principles discussed. In this manner, design time and cost can be saved. Moreover, a set location ensures that antenna connector 108 does not interfere with the ability to reconfigure a particular wireless modem assembly 100 for a new Wireless communication protocol and/or air interface standard. In one embodiment, for example, connector 108 comprises a single MMCX connector located in one corner of the RF portion of core module 102.

A second antenna may be required depending on what advanced features are supported by assembly 100. For example, if assembly 100 supports Bluetooth™ or Global Positioning System (GPS) applications, then a second antenna may be needed. A secondary antenna connection can be located elsewhere and is not necessarily limited by the location of antenna connector 108. Preferably, however, assembly 100 also comprises a standard location for any secondary antenna connector that may be required. As with antenna connector 108, a standard location for secondary antenna can save time and cost.

b. The Baseband Section

Figure 3:
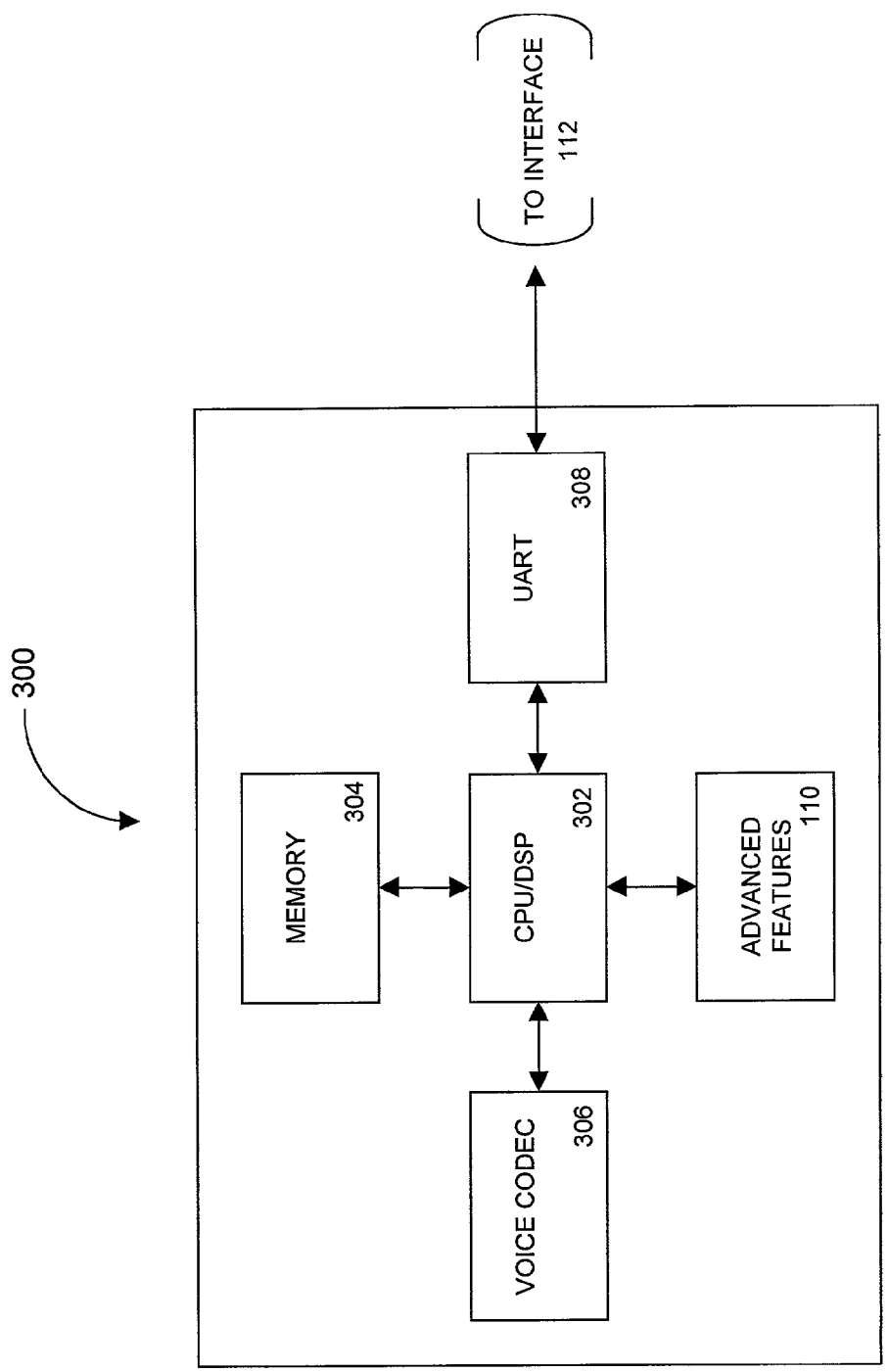
FIG. 3 is an example embodiment of a baseband section that can be included in the wireless modem assembly of FIG. 1.

FIG. 3 illustrates an example embodiment of a baseband section 300. Baseband section 300 comprises a Control Processing Unit (CPU) and/or a Digital Signal Processor (DSP), such as CPU/DSP 302, which controls the operation of baseband section 300. Baseband section 300 also includes a memory 304 for storing application software used by CPU/DSP 302 to operate baseband section 300. Memory 304 can also store data used by baseband section 300. Baseband section 300 can also includes a voice codec 306. Voice codec 306 is used to encode and decode voice information. Therefore, if assembly 100 is capable of communicating voice as well as data, voice codec 306 can be included in baseband section 300.

Baseband section 300 is responsible for communicating with a host device, such as host device 114. Baseband section 106 takes information from host device 114 and encodes it into a baseband signal that is passed to an RF section, such as RF section 104, for transmission over a communication channel to another device. Conversely, baseband section 300 also takes baseband signals from RF section 104 and decodes them into signals that can be sent to host device 114. In order to communicate with host device 114, baseband section 300 must be capable of implementing a software protocol that host device 114 can interpret. Preferably, a wireless modem assembly 100 designed in accordance with the systems and methods for multi-platform wireless modem, and in particular with the standardization principles discussed above, implements a standard host communication protocol for communication with a host device 114. Preferably, the host communication software protocol primarily comprises an AT command set that includes both technology-agnostic as well as technology specific AT commands. Again, such standardization saves design time and cost, because each core module 102 can be designed to implement the same software protocol.

Communication with host device 114 is preferably controlled by a communication device, such as a Universal Asynchronous Receiver Transmitter (UART) 308 as illustrated in FIG. 3. Further, the software used by baseband section 300 to implement the host communication protocol for communicating with host device 114 is preferably stored in memory 304.

The encoding and decoding of baseband signals communicated between baseband section 300 and RF section 104 is performed by CPU/DSP 302. In order to correctly encode and decode the baseband signals, baseband section 300 must be configured to support the appropriate wireless communication protocol for the wireless communication system.

The software used by baseband section 300 to implement the communication protocol is also preferably stored in memory 304. The appropriate communication protocol is dictated by, or is part of, the air interface standard being implemented. Some example communication protocols that can be supported are CDPD, Metricom/Ricochet2, General Packet Radio Service (GPRS)/GPS, EDGE, CDMA 1×RTT (Real Time Technology), CDMA 3×RTT, and CDMA HDR (High Data Rate).

Significantly, because of the standardization employed by the systems and methods for a multi-platform wireless modem, reconfiguration of a wireless modem assembly 100 to support a new communication protocol can be done quickly, efficiently, and with very little customization, merely by replacing core module 102, and possibly the antenna included in assembly 100. Alternatively, in some embodiments core module 102 can be reconfigured for a new communication protocol via a software reconfiguration due to the implementation of the standardization principles discussed. Again this can significantly streamline the manufacturing process and can even allow over the air reconfiguration for units in the field.

The design of baseband section 300 can also include advanced feature support 310 that allows wireless modem assembly 100 to capture applications such as MPEG audio layer 3 (MP3), Moving Picture Experts Group (MPEG)-4, Musical Instrument Digital Interface (MIDI), Digital-Voice for voice recognition, voice-to-text and text-to-voice conversion, voice memo/recording, GPS, Bluetooth™/W-PAN (Wireless-Personal Area Network), Wireless-Local Area Network (WLAN), etc. FIG. 3 shows, schematically, the support for future advanced features. The objective of FIG. 3, in this regard, is to demonstrate that when an advanced feature 110 is implemented, baseband section 300 makes available the data appropriate to this "feature" to CPU/DSP 302. Further, appropriate application software stored, for example, in memory 304 can then enable CPU/DSP 302 to support the advanced feature.

From the perspective of interface 112, in FIG. 1, these advanced features are preferably supported by the connection scheme with host device 114. Preferably, the advanced features are supported in interface 112 only to the extent that they do not require an excessive number of dedicated hardware interface signals. To ensure adequate support for advanced features, however, interface 112 preferably includes at least limited future flexibility in the form of reserved or undefined (NoConnect/NC) interface signals. Another option available for assembly 100 implementations is the addition of hardware external to assembly 100 that can route the "advanced feature" data across interface 112 to host device 114. This is discussed in detail in the next section.

Therefore, implementing the standardization principles described in designing core module 102 allows the manufacturing process to be streamlined, thus saving time and cost. Reconfiguration of fielded units is also easier and less time consuming. Notably, implementation of the standardization principles can even allow for software reconfiguration of wireless modem assembly 100 either in the factory or in the field. This can have important cost savings implications. For example, in the factory, the manufacturing process an be streamlined by designing one core module 102, and therefore one assembly 100. At the end of the process, each core module 102, or assembly 100, can be configured for the appropriate application via a software configuration step. Similarly, fielded assemblies can be quickly and easily reconfigured by interfacing them to a computer and downloading the appropriate software. In some embodiments, over the air reconfiguration can also be implemented.

2. Modem Interface Device

Figure 4:
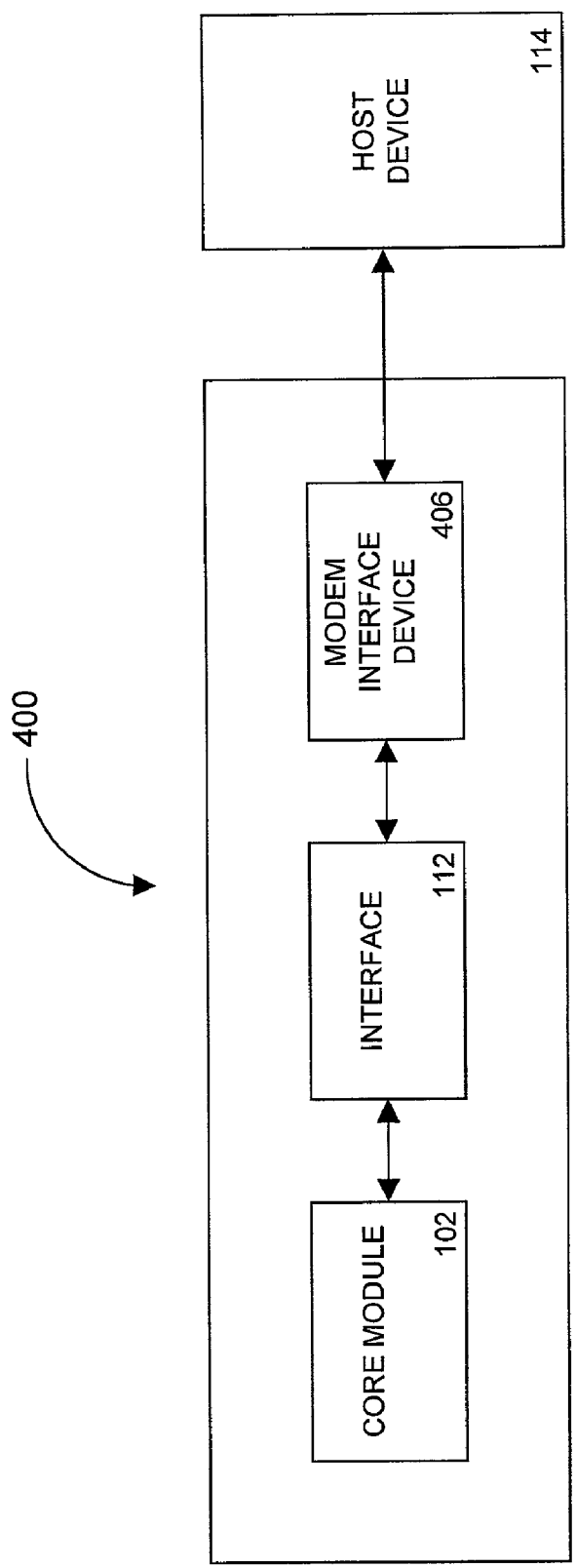
FIG. 4 is an example embodiment of a wireless modem assembly that includes a wireless interface device.
Figure 5:
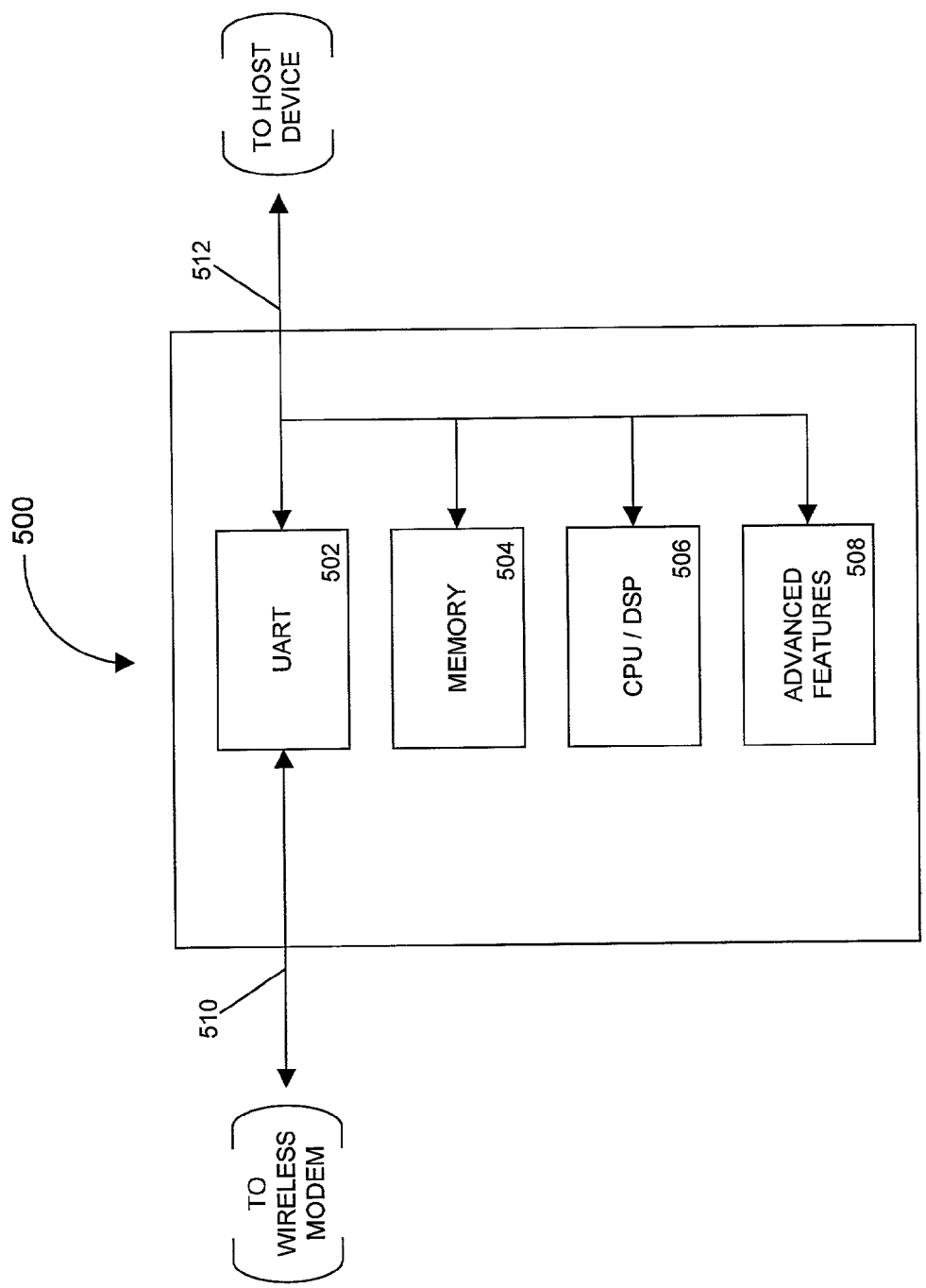
FIG. 5 is an example embodiment of the wireless interface device of FIG. 6.

FIG. 4 illustrates a wireless modem assembly 400 that includes a wireless interface device 406 that interfaces interface 112 and host device 114. Core module 102 communicates to host device 114 through interface 112 as before, however, modem interface device 406 can be required for a variety of reasons. One reason device 406 can be required is to convert from the standardized interface of interface 112 to a host specific interface for host device 114. Another reason is that device 406 can be used to add to or expand the functionality of assembly 400, which is more clearly demonstrated by the example embodiment of a modem interface device 500 illustrated in FIG. 5. Modem interface device 500 comprises UART 502, memory 504, CPU/DSP 506, and advanced feature set 508.

Several advantages accrue as a result of including modem interface device 500. For example, as data services continue to evolve, modem designs will likely not have sufficient CPU/DSP processing power for execution of the extensive user/application code that will be required. This is primarily due to the overhead involved in simply managing the air interface. Further, in certain embodiments extensive processing power within assembly 400 is undesirable for reasons of cost efficiency. Therefore, additional functionality including processing, CPU/DSP 506, and/or application memory 504 can be provided by including them in a modem interface device 500.

Additionally, if extensive application processing is performed within assembly 400 itself, the execution speed may be impacted by a relatively slow serial interface between assembly 400 and host 408. This can be another reason to include a modem interface device, such as device 500. For example, even if the fastest Universal Serial Bus (USB) speeds, e.g., 12 Mbps of USB 1.1, are available, execution speed can still be impacted. Therefore, additional CPU/DSP 506 and/or memory 504 added in a modem interface device 500 can be used to prevent a relatively slow serial interface at the output of assembly 400 from precluding more powerful implementations.

Such "co-processing" capability is a powerful extension of the capabilities of assembly 400. For example, if an even higher-speed serial connection is required between assembly 400 and host device 408, then the compatible USB 2.0 interface can, for example, be supported by including the appropriate resources in modem interface device 500. Moreover, instead of including support for advanced features 110 in assembly 100, such support can be included in modem interface device 500 as illustrated by advanced feature support 508.

Thus, a modem interface device, such as devices 406 and 500, can allow for a streamlined manufacturing process even when particular applications require specialized features and/or resources. Wireless modem assembly 400 can still be designed in accordance with the standardization principles discussed above, which will provide all of the benefits described, and any application specific features can be incorporated into a modem interface device. Therefore, the manufacturing process for different assemblies 400 can be substantially the same, the only difference being what type of modem interface device is used. Support for varying features can of course result in differences in the application software as well, but accommodating these differences through the combination of application specific hardware and a specific modem interface device is much easier than accommodating them through design differences in assembly 400.

3. Power Management

Another aspect of the standardization principles discussed above is power management. Preferably, therefore, baseband section 106 also implements a standard power management scheme. To support this power management scheme, interface 112 preferably includes a standard power supply from host device 114. For example, a nominal 3.6V supply supporting 3.3V LVTTL signaling can be used. In addition, there is preferably a standby power source from host device 114 to assembly 100.

Preferably, the power management scheme is divided into three categories: network (air-interface) based, host (operating system) based, and internal-modem-specific based. Network power management is specific to the air-interface standard, and includes power saving methods such as the Quick Paging channel in a CDMA2000™ System. An example of host/operating-system based power management is that which applies to the Personal Computing Memory Card Interface Association (PCMCIA) standards, which include reference to the Advanced Configuration and Power Interface (ACPI) standard. An example of an internal modem-specific power savings feature may be shutting off certain parts of the assemblies electronics based on rules not covered by network or host protocols, or as specifically demanded by the user and implemented by modem assembly 100.

Again, the design and manufacture of assembly 100 can be streamlined by implementing the standardized power management described above because it avoids the burden of incorporating differing power management schemes into assembly 100. It also simplifies the design of standard interface 112, because it does not need to support a variety of power management signals and protocols. Nor does it need to be changed or reconfigured to support such differing signals and protocols.

4. SIM and/or R-UIM support

As illustrated in FIG. 1, support for the GSM Subscriber Identity Module (SIM) card 116 can be provided within assembly 100. Interface 112 can accommodate this support depending on whether SIM card 116 is "external" or "internal". Thus, the SIM 116 can take the following forms:
  i. External. The SIM signals are sent to host device 114, which manages SIM card 116
  ii. Internal. Assembly 100 is provided with an "internal" SIM module 116, extracting SIM signals from interface 112 and driving a SIM cardholder that is preferably mounted on assembly 100.

Further, support for the CDMA/ANSI-136 Replaceable Universal Identity Module (R-UIM) (not shown) is also preferably provided via shared use of the SIM signals of interface 112. The R-UIM standard is backward compatible with the SIM standard.

5. Standard Form Factor

Another area of standardization that is preferably included in wireless modem assemblies designed in accordance with the systems and methods for a multi-platform wireless modem is the form factor of assembly 100. Preferably, each wireless modem assembly 100 is designed in accordance with one of two standardized form factors. In the first of these form factors, the width of the modem is approximately 54 mm, the length is approximately 72.9 mm, and the thickness is approximately 5.6 mm. The second standard form factor is intended to be compatible with the compact flash form factor. Accordingly, this form factor has a width of approximately 42.8 mm, a length of approximately 36.4 mm, and a thickness of approximately 5.6 mm. It should be noted, however, that some or all of these dimensions may need to change depending on the requirements of a particular implementation. Further, other standardized form factors are clearly contemplated and within the scope of the SIM's described herein. It is also preferable that each of these standard form factors also specifies a location for a connector that implements interface 112.

Again, by standardizing the form factor, the manufacturing process can be made less costly and time consuming. In addition, upgrading or changing wireless modem assemblies 100 is made easier because the new modem will have the same form factor and host interface 112. Thus, if a user wanted to upgrade his wireless data service, for example, the user could simply install the requisite software and then simply swap the old assembly 100 for the appropriate new assembly 100. This makes upgrading, or migrating from one technology to another easier and less costly, which is a benefit to consumers, system integrators, and manufacturers.

6. Standard Interface

Preferably, assembly 100 comprises a standard interface 112. In other words, regardless of what type of device assembly 100 is interfacing with, one aspect of the systems and methods for a multi-platform wireless modem is that interface 112 can use a standard interface. Thus, the design of wireless modem assemblies 110 is simplified if designed in accordance with the systems and methods for a multi-platform wireless modem.

As noted, because there are many possible host devices, not all of which are compatible with interface 112, wireless modem assembly 100 may need a modem interface device 500 to convert interface 112 to an interface required by host device 114. Moreover, some devices 114 may require that a host-specific interface be used. For example, in wireless modem assemblies 100 designed for insertion into a PCMCIA slot, standard interface 112 can be replaced by the standard PCMCIA interface. Alternatively, a modem interface device 500 can be used to convert interface 112 to the PCMCIA interface.

Figure 6:
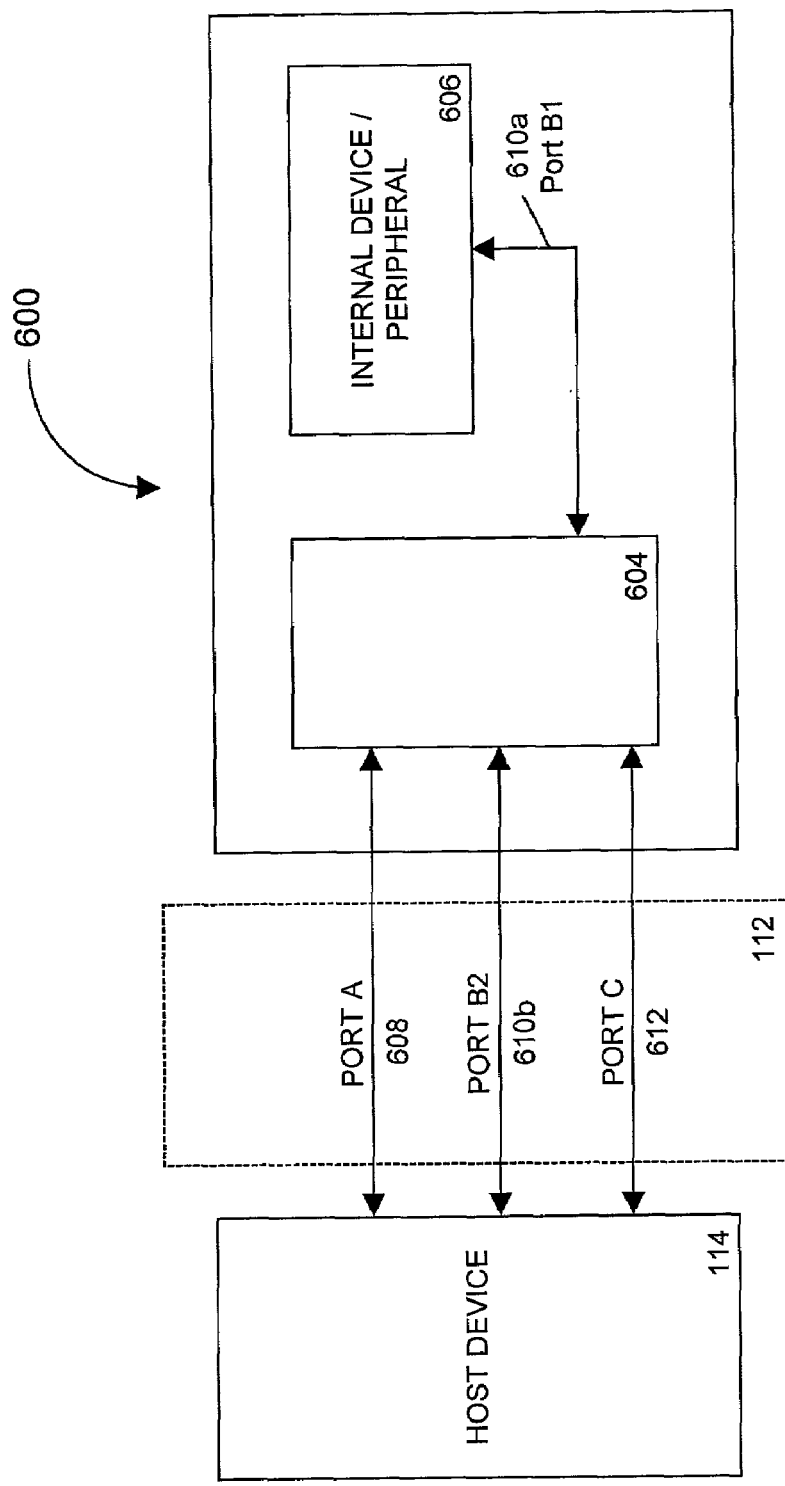
FIG. 6 is an example embodiment illustrating serial data communication interfaces between a wireless modem and a host device in accordance with the present invention.

Standard interface 112 includes several serial data interfaces for interfacing a host device 114 to a wireless modem assembly 100. These serial data interfaces are illustrated, interfacing host device 114 and modem assembly 600, as serial data interface 608, 610, and 612 in FIG. 6. Preferably, interface 608 is a primary Recommended Standard-232 (RS232) serial data interface, known as Port A. Port A preferably supports the following signal set: TXD, RXD, CTS, RTS, DTR, DSR. If interface 112 supports serial data interface 612, then support for Port A is desired but not required.

Additionally, interface 112 preferably supports a secondary RS232 serial data interface, known as Port B. Port B preferably comprises the two signals TXD2 and RXD2. Port B can be used within the module in one of two ways. The standard use of 610*a*, designated Port B1, is for internal peripheral device 606 communication. This can be used, for example, for communication with a device such as a GPS receiver. In this case, the signals TXD2 and RXD2 are signals internal to wireless modem assembly 600 and do not appear on interface 112. An alternate use comprises interfaced 610*b*, designated Port B2, utilizes the same two signals and forms an interface to host device 602. In this case, the signals can be multiplexed with two General Purpose Input/Output (GPIO), which are discussed below. Port B2 or Port B1 preferably supports a minimum rate of 38.4 kbps, and a rate of 115 kbps is preferable. Further, interface 112 preferably includes optional support for a USB serial data interface, known as Port C 116. Support for Port C is provided via two signals included in interface 112, USB+ and USB−, which form a differential signal pair. Preferably, Port C supports a minimum rate of 2.5 Mbps, which is necessary, for example, to support the IMT-2000/3G data rates. If Port C is present, it preferably forms the primary communication interface for WAN data between modem assembly 600 and host 114. If there is no Port C support, then by default Port A serves as the WAN data communication transport.

Preferably, Port A and/or Port C support the maximum serial data rates required by the communication protocols implemented by baseband section 106, plus a nominal 10% overhead. If Port A cannot support the desired rate, then Port C can be selected. Further, If Port C supports the maximum data rates, then Port A need only support a minimum rate of 38.4 kbps, but a rate of 115 kbps is preferable.

In addition to serial data interfaces 608, 610, and 612, interface 112 also preferably includes the following interfaces between host device 102 and modem assembly 600: power and ground interfaces to modem assembly 600, a wireless modem status interface, at least one ADC input to modem assembly 600, a power standby input to modem 600, a JTAG interface between host device 114 and modem assembly 600, and a GPIO interface, comprising a plurality of GPIO inputs/outputs. The GPIO interface preferably comprises as many GPIO signals as possible within the constraint of a reasonable connector total pin count. Interface 112 also preferably provides a SIM interface configured to provide a data communication interface between host device 114, or wireless modem assembly 604, and a SIM card (not shown) included in wireless modem assembly 600. There is also preferably an audio interface configured to provide a buzzer output to host device 114, a speaker output to host device 114, a microphone input to wireless modem assembly 600, and a digital voice interface between host device 114 and wireless modem assembly 600. Other interfaces or signals that can be included in interface 112 include: support for at least one ADC input, support for a "standby" power source from the host 602 to modem assembly 600, and support for a JTAG (IEEE 1149) interface.

Interface 112 is typically embodied in a standard connector. Preferably, the connector is a 70-pin connector. 70-pins allows enough pins to cover the features described, with an adequate amount of pins left over for future expansion. One example connector that can be used is SMK's CPB7270-1211 (Mtype) connector. The following tables provide an example pin description for interface 112 implemented in a 70-pin connector. Note that the actual pin numbers are by way of example only.

TABLE 1

Pin Assignments by Function

| Pin Number | Name | Direction (with respect to the modem) | Power-on Reset State | Description |
|---|---|---|---|---|
| Basic function interface | | | | |
| 28, 29, 30, 31 | VCC1 | Power | — | Power Supply Connection to the Modem for all Circuitry Except for the RF Power Amplifier |
| 18, 19, 20, 21, 22, 23, 24, 25 | VCC2 | Power | — | Power Supply Connection to the Modem for the RF Power Amplifier Only |
| 6, 8, 9, 11, 17, 26, 27, 42, 48, 60, 61, 70 | GND | Power | — | Modem Signal and Chassis Ground |
| 59 | PWR_IND | Output | — | Power Indicator: HIGH: Indicates that the modem is on LOW: Indicates that the modem is off |
| 57 | SM_IND | Output | — | Sleep Mode Indicator: HIGH: Indicates that the Modem is on LOW: Indicates that the modem is off |
| 58 | WKUP | Input | — | Wake up Input: (Active High Pulse) Refer to Applications information for more details. |
| 56 | DTM | Input | — | Data to Modem: (3.3 V Logic Level) In RS-232 terms, this is called "TXD" |
| 55 | DFM | Output | — | Data From Modem: (3.3 V Logic Level) In RS-232 terms, this is called "RXD" |
| 51 | RTS | Input | — | Ready to Send: (3.3 V Logic Level) |
| 52 | CTS | Output | — | Clear to Send: (3.3 V Logic Level) |
| 54 | DTR | Input | — | DTE Ready: (3.3 V Logic Level) |
| 53 | DSR | Output | — | DCE Ready: (3.3 V Logic Level) |
| 49 | GPIO1 | Bi-directional | Input with Pullup | General Purpose Configurable Input or Output: Refer to the AT command set for the Default State |
| 50 | GPIO2 | Bi-directional | Input with Pullup | General Purpose Configurable Input or Output: Refer to the AT command set for the Default State |
| 47 | GPIO3 | Bi-directional | Input with Pulldown | General Purpose Configurable Input or Output: Refer to the AT command set for the Default State |

TABLE 1-continued

Pin Assignments by Function

| Pin Number | Name | Direction (with respect to the modem) | Power-on Reset State | Description |
|---|---|---|---|---|
| 46 | GPIO4 | Bi-directional | Input with Pullup | General Purpose Configurable Input or Output: Refer to the AT command set for the Default State |
| 45 | GPIO5 | Bi-directional | Input with Pulldown | General Purpose Configurable Input or Output: Refer to the AT command set for the Default State |
| 44 | GPIO6 | Bi-directional | Input with Pullup | General Purpose Configurable Input or Output: Refer to the AT command set for the Default State |
| 5 | ADC_IN1 | Analog Input | ADC Input | ADC Input: This pin is connected to one channel of an ADC. |
| | | SIM Interface | | |
| 36 | VCC_SIM (C1) | Power | — | Power Supply For the SIM/R-UIM module |
| 34 | DATA_SIM (C7) | Input/Output | — | Data to and From the SIM/R-UIM module |
| 32 | CLK_SIM (C3) | Input | — | Clock to the SIM/R-UIM |
| 39 | RST_SIM (C2) | Input | — | Reset to the SIM/R-UIM |
| 37 | SPARE_SIM (C8) | TBD | — | Spare SIM/R-UIM signal (future) |
| 35 | SPARE_SIM (C4) | TBD | — | Spare SIM/R-UIM signal (future) |
| 33 | SIM_NOT_IN | Input | — | Indicator for SIM/R-UIM presence |
| | | Audio Interface | | |
| 2 | MIC_INP | Input | — | Positive differential input for the microphone (analog voice) |
| 4 | MIC_INN | Input | — | Negative differential input for the microphone (analog voice) |
| 3 | SPKR_OUTP | Output | — | Positive differential output for the speaker (analog voice) |
| 1 | SPKR_OUTN | Output | — | Positive differential output for the speaker (analog voice) |
| 15 | DIGVOICE_TX | Output | — | Digital Serial Voice Output |
| 13 | DIGVOICE_RX | Input | — | Digital Serial Voice Input |
| 12 | DIGVOICE_CLK | Output | — | Digital Voice Clock |
| 10 | DIGVOICE_FRM | Output | — | Digital Voice Frame |
| 16 | BUZZER | Output | — | Buzzer Output |
| | | Miscellaneous | | |
| 14 | VCC_STANDBY | Power | — | Input Power for Standby of the Modem |
| 7 | ADC_IN2 | Input | — | ADC Input: This pin is connected to one channel of an ADC. |
| 43 | GPIO7 | Bi-directional | Input with Pullup | General Purpose Configurable Input or Output |
| 40 | GPIO8 | Bi-directional | Input with Pullup | General Purpose Configurable Input or Output |
| 41 | GPIO9 | Bi-directional | Input with Pulldown | General Purpose configurable Input or Output |
| 38 | GPIO10 | Bi-directional | Input with Pulldown | General Purpose Configurable Input or Output: |
| 62, 63, 64, 65, 66, 67, 68, 69 | Future | TBD | TBD | TBD |

TABLE II

Pin Assignments by Pin Number

| Pin Number | Name | Direction (with respect to the modem) | Power-on Reset State | Description |
|---|---|---|---|---|
| 1 | SPKR_OUTN | Output | — | Positive differential output for the speaker (analog voice) |
| 2 | MIC_INP | Input | — | Positive differential input for the microphone (analog voice) |
| 3 | SPKR_OUTP | Output | — | Positive differential output for the speaker (analog voice) |
| 4 | MIC_INN | Input | — | Negative differential input for the microphone (analog voice) |

TABLE II-continued

Pin Assignments by Pin Number

| Pin Number | Name | Direction (with respect to the modem) | Power-on Reset State | Description |
|---|---|---|---|---|
| 5 | ADC_IN1 | Analog Input | ADC Input | ADC Input: This pin is connected to one channel of an ADC. |
| 6 | GND | Power | — | Modem Signal and Chassis Ground |
| 7 | ADC_IN2 | Input | — | ADC Input: This pin is connected to one channel of an ADC. |
| 8 | GND | Power | — | Modem Signal and Chassis Ground |
| 9 | GND | Power | — | Modem Signal and Chassis Ground |
| 10 | DIGVOICE_FRM | Output | — | Digital Voice Frame |
| 11 | GND | Power | — | Modem Signal and Chassis Ground |
| 12 | DIGVOICE_CLK | Output | — | Digital Voice Clock |
| 13 | DIGVOICE_RX | Input | — | Digital Serial Voice Input |
| 14 | VCC_STANDBY | Power | — | Input Power for Standby of the Modem |
| 15 | DIGVOICE_TX | Output | — | Digital Serial Voice Output |
| 16 | BUZZER | Output | — | Buzzer Output |
| 17 | GND | Power | — | Modem Signal and Chassis Ground |
| 18 | VCC2 | Power | — | Power Supply Connection to the Modem for the RF Power Amplifier Only |
| 19 | VCC2 | Power | — | Power Supply Connection to the Modem for the RF Power Amplifier Only |
| 20 | VCC2 | Power | — | Power Supply Connection to the Modem for the RF Power Amplifier Only |
| 21 | VCC2 | Power | — | Power Supply Connection to the Modem for the RF Power Amplifier Only |
| 22 | VCC2 | Power | — | Power Supply Connection to the Modem for the RF Power Amplifier Only |
| 23 | VCC2 | Power | — | Power Supply Connection to the Modem for the RF Power Amplifier Only |
| 24 | VCC2 | Power | — | Power Supply Connection to the Modem for the RF Power Amplifier Only |
| 25 | VCC2 | Power | — | Power Supply Connection to the Modem for the RF Power Amplifier Only |
| 26 | GND | Power | — | Modem Signal and Chassis Ground |
| 27 | GND | Power | — | Modem Signal and Chassis Ground |
| 28 | VCC1 | Power | — | Power Supply Connection to the Modem for all Circuitry Except for the RF Power Amplifier |
| 29 | VCC1 | Power | — | Power Supply Connection to the Modem for all Circuitry Except for the RF Power Amplifier |
| 30 | VCC1 | Power | — | Power Supply Connection to the Modem for all Circuitry Except for the RF Power Amplifier |
| 31 | VCC1 | Power | — | Power Supply Connection to the Modem for all Circuitry Except for the RF Power Amplifier |
| 32 | CLK_SIM (C3) | Input | — | Clock to the SIM/R-UIM |
| 33 | SIM_NOT_IN | Input | — | Indicator for SIM/R-UIM presence |
| 34 | DATA_SIM (C7) | Input/Output | — | Data to and From the SIM/R-UIM module |
| 35 | SPARE_SIM (C4) | TBD | — | Spare SIM/R-UIM signal (future) |
| 36 | VCC_SIM (C1) | Power | — | Power Supply For the SIM/R-UIM module |
| 37 | SPARE_SIM (C8) | TBD | — | Spare SIM/R-UIM signal (future) |
| 38 | GPIO10 | Bi-directional | Input with Pulldown | General Purpose Configurable Input or Output: Refer to the AT command set for the Default State |
| 39 | RST_SIM (C2) | Input | — | Reset to the SIM/R-UIM |
| 40 | GPIO8 | Bi-directional | Input with Pullup | General Purpose Configurable Input or Output: Refer to the AT command set for the Default State |
| 41 | GPIO9 | Bi-directional | Input with Pulldown | General Purpose Configurable Input or Output: Refer to the AT command set for the Default State |
| 42 | GND | Power | — | Modem Signal and Chassis Ground |

TABLE II-continued

Pin Assignments by Pin Number

| Pin Number | Name | Direction (with respect to the modem) | Power-on Reset State | Description |
|---|---|---|---|---|
| 43 | GPIO7 | Bi-directional | Input with Pullup | General Purpose Configurable Input or Output: Refer to the AT command set for the Default State |
| 44 | GPIO6 | Bi-directional | Input with Pullup | General Purpose Configurable Input or Output: Refer to the AT command set for the Default State |
| 45 | GPIO5 | Bi-directional | Input with Pulldown | General Purpose Configurable Input or Output: Refer to the AT command set for the Default State |
| 46 | GPIO4 | Bi-directional | Input with Pullup | General Purpose Configurable Input or Output: Refer to the AT command set for the Default State |
| 47 | GPIO3 | Bi-directional | Input with Pulldown | General Purpose Configurable Input or Output: Refer to the AT command set for the Default State |
| 48 | GND | Power | — | Modem Signal and Chassis Ground |
| 49 | GPIO1 | Bi-directional | Input with Pullup | General Purpose Configurable Input or Output: Refer to the AT command set for the Default State |
| 50 | GPIO2 | Bi-directional | Input with Pullup | General Purpose Configurable Input or Output: Refer to the AT command set for the Default State |
| 51 | RTS | Input | — | Ready to Send: (3.3 V Logic Level) |
| 52 | CTS | Output | — | Clear to Send: (3.3 V Logic Level) |
| 53 | DSR | Output | — | DCE Ready: (3.3 V Logic Level) |
| 54 | DTR | Input | — | DTE Ready: (3.3 V Logic Level) |
| 55 | DFM | Output | — | Data From Modem: (3.3 V Logic Level) In RS-232 terms, this is called "RXD" |
| 56 | DTM | Input | — | Data to Modem: (3.3 V Logic Level) In RS-232 terms, this is called "TXD" |
| 57 | SM_IND | Output | — | Sleep Mode Indicator: HIGH: Indicates that the Modem is on LOW: Indicates that the modem is off |
| 58 | WKUP | Input | — | Wake up Input: (Active High Pulse) Refer to Applications information for more details. |
| 59 | PWR_IND | Output | — | Power Indicator: HIGH: Indicates that the modem is on LOW: Indicates that the modem is off |
| 60 | GND | Power | — | Modem Signal and Chassis Ground |
| 61 | GND | Power | — | Modem Signal and Chassis Ground |
| 62 | Future | TBD | TBD | TBD |
| 63 | Future | TBD | TBD | TBD |
| 64 | Future | TBD | TBD | TBD |
| 65 | Future | TBD | TBD | TBD |
| 66 | Future | TBD | TBD | TBD |
| 67 | Future | TBD | TBD | TBD |
| 68 | Future | TBD | TBD | TBD |
| 69 | Future | TBD | TBD | TBD |
| 70 | GND | Power | — | Modem Signal and Chassis Ground |

What is claimed is:

1. A wireless modem, comprising:

a standard wireless modem assembly including a standard interface for interfacing the wireless modem assembly with a host device, the standard interfacing including a primary serial interface configured to support data communication between the host device and the wireless modem assembly;

a secondary serial interface configured to support data communication between the host device and the wireless modem assembly or to support data communication internal to the wireless modem assembly; and a differential serial interface configured to support data communication between the host device and the wireless modem assembly using a differential signal pair; and a core module configured to be removably secured in the standard wireless modem assembly; the core module including a radio frequency section configured for interfacing the wireless modem to other devices over a wireless communication channel and a baseband section configured for communication information between the host device and the other devices, the core module further being configured to communicate with the host device through the standard interface.

2. The wireless modem of claim 1, wherein the standard interface further comprises comprising a power interface and a ground interface to the wireless modem assembly.

3. The standard interface of claim 2, wherein the power interface supports LVTTL signaling.

4. The wireless modem of claim 1, wherein the standard interface further comprises a wireless modem assembly status interface.

5. The wireless modem of claim 1, wherein the standard interface further comprises at least one ADC input to the wireless modem assembly.

6. The wireless modem of claim 1, wherein the standard interface further comprises a power standby input to the wireless modem assembly.

7. The wireless modem of claim 1, wherein the standard interface further comprises a JTAG interface.

8. The wireless modem of claim 1, wherein the standard interface further comprises a plurality of GPIO.

9. The wireless modem of claim 8, wherein the second serial interface is mutlitplexed with at least one of the plurality of GPIO interfaces.

10. The wireless modem of claim 9, wherein the SIM interface comprises a SIM-DATA, SIM-CLK, SIM-RESET, SIM-REMOVED, and SIM-VCC signals.

11. The wireless modem of claim 1, wherein the standard interface further comprises a SIM interface configured to support data communication between the host device and a SIM card included in the wireless modem assembly.

12. The wireless modem of claim 1, wherein the standard interface further comprises comprising an audio interface configured to provide a buzzer output to the host device, a speaker output to the host device, a microphone input to the wireless modem assembly, and a digital voice interface between the host device and the wireless modem assembly.

13. The wireless modem of claim 12, wherein the speaker output comprises a differential signal pair.

14. The wireless modem of claim 12, wherein the microphone input comprises a differential signal pair.

15. The wireless modem of claim 12, wherein the digital voice input comprises a DV-CLK, DV-FRAME, DV-TX-DATA, and DV-RXDATA signals.

16. The wireless modem of claim 1, wherein the standard interface further comprises comprising a sleep mode indicator output to the host device configured to indicate where the wireless modem assembly is on or off.

17. The wireless modem of claim 1, wherein the standard interface further comprises a power mode indicator output to the host device configured to indicate whether the wireless modem assembly is in a sleep mode.

18. The wireless modem of claim 1, wherein the standard interface further comprises a wake up input to the wireless modem assembly configured to interface a wakeup signal to the wireless modem assembly.

19. The wireless modem of claim 1, wherein the primary serial interface is optionally included if the differential serial interface is included in the standard interface.

20. The wireless modem of claim 1, wherein the primary serial interface supports a maximum data rate of 115 Kbps.

21. The wireless modem of claim 1, wherein the primary serial interface is a universal serial interface that includes a TXD, RXD, CTS, RTS, DTR, and DSR signals.

22. The wireless modem of claim 1, wherein the primary serial interface supports a maximum data rate of 2.5 Mbps.

23. The wireless modem of claim 1, wherein the primary serial interface supports a minimum data rate of 38.4 kbps.

24. The wireless modem of claim 1, wherein the secondary serial interface is a universal serial bus interface comprising a TXD2 and RXD2 a signals.

25. The wireless modem of claim 1, wherein the secondary serial interface supports a maximum data rate of 115 Kbps.

26. The wireless modem of claim 1, wherein the secondary serial interface supports a maximum data rate of 38.4 Kbps.

27. The wireless modem of claim 1, wherein the differential serial interface supports a maximum data rate of 2.5 Mbps.

28. The wireless modem of claim 1, wherein the standard interface is implemented in a 70-pin connector.

29. A wireless modem, comprising:
a standard wireless modem assembly including a standard interface, the standard interface including:
a basic function interface configured to provide at least one serial data communication interface between a host device and a wireless modem assembly;
a SIM interface configured to provide a data communication interface between the host device and a SIM card included in the wireless modem assembly; and
an audio interface between the host device and the wireless modem assembly; and
a core module configured to be removably secured in the standard wireless modem assembly; the core module including a radio frequency section configured for interfacing the wireless modem to other devices over a wireless communication channel and a baseband section configured for communication information between the host device and the other devices, the core module further being configured to communicate with the host device through the standard interface.

30. The wireless modem of claim 29, wherein the basic function interface further comprises a power and a ground interface to the wireless modem assembly, a wireless modem assembly status interface, at least one ADC input to the wireless modem assembly, a power standby input to the wireless modem assembly, a JTAG interface between the host device and the wireless modem assembly, and a plurality of GIPO inputs/outputs between the host device and the wireless modem assembly.

31. The wireless modem of claim 30, wherein the power interface comprises:
a power indicator output to the host device configured to indicate whether the wireless modem assembly is on or off;
a sleep mode indicator output to the host device configured to indicate whether the wireless assembly is in sleep mode; and
a wake up input to the wireless modem assembly configured to the interface a wakeup signal to the wireless modem assembly.

32. The wireless modem of claim 30, wherein the secondary serial interface is multiplexed with at least one of the plurality of GPIO.

33. The wireless modem of claim 30, wherein the differential serial interface support a maximum data rate of 2.5 Mbps.

34. The wireless modem of claim 29, wherein the audio interface is configured to provide a buzzer output to the host device, a speaker to the host device, a microphone input to the wireless modem assembly, and a digital voice interface.

35. The wireless modem of claim 29 wherein the basic function interface further comprises:
a primary serial interface configured to support data communication between the host device and the wireless modem assembly;
a secondary serial interface configured to support data communication between the host device and the wire less modem assembly or to support data communication internal to the wireless modem assembly; and an optional differential serial interface configured to support data communication between the host device and the wireless modem assembly using a differential signal pair.

36. The wireless modem standard interface of claim 35, wherein the primary serial interface is optionally included if the differential serial interface is included in the standard interface.

37. The wireless modem of claim 35, wherein the primary serial interface supports a maximum data rate of up to 2.5 Mbps if the differential serial interface is not included and a maximum data rate of 115 Kpbs if the differential serial interface is included.

38. The wireless modem of claim 35, wherein the primary serial interface supports a minimum data rate of 38.4 Kbps.

39. The wireless modem of claim 35, wherein the secondary serial interface is a universal serial bus interface comprising a TXD2 and a RXD2 signals.

40. The wireless modem of claim 35, wherein the secondary serial interface supports a maximum data rate of 115 Kbps.

41. The wireless modem of claim 35, wherein the secondary serial interface supports a minimum data rate of 38.4 Kbps.

42. The wireless modem of claim 29, wherein the SIM interface comprises a SIM-DATA, a SIM-CLK, a SIM-RESET, a SIM-REMOVED, and a SIM-VCC signals.

43. The wireless modem of claim 29, wherein the standard interface is implemented in a 70-pin connector.

44. The wireless modem of claim 43, wherein the connector includes unused pins for future feature expansion.

* * * * *